(No Model.) 2 Sheets—Sheet 2.
E. D. RATHBUN.
GATE.
No. 295,674. Patented Mar. 25, 1884.
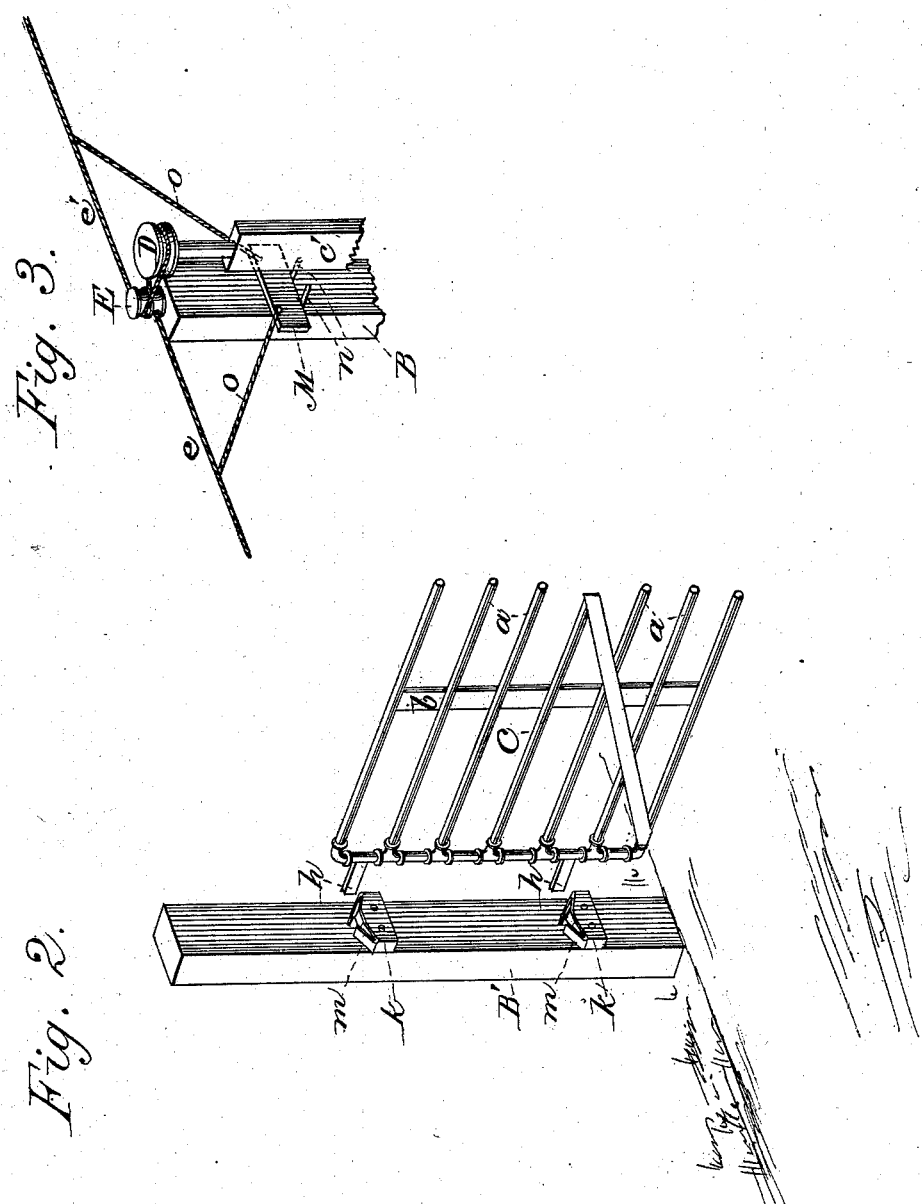

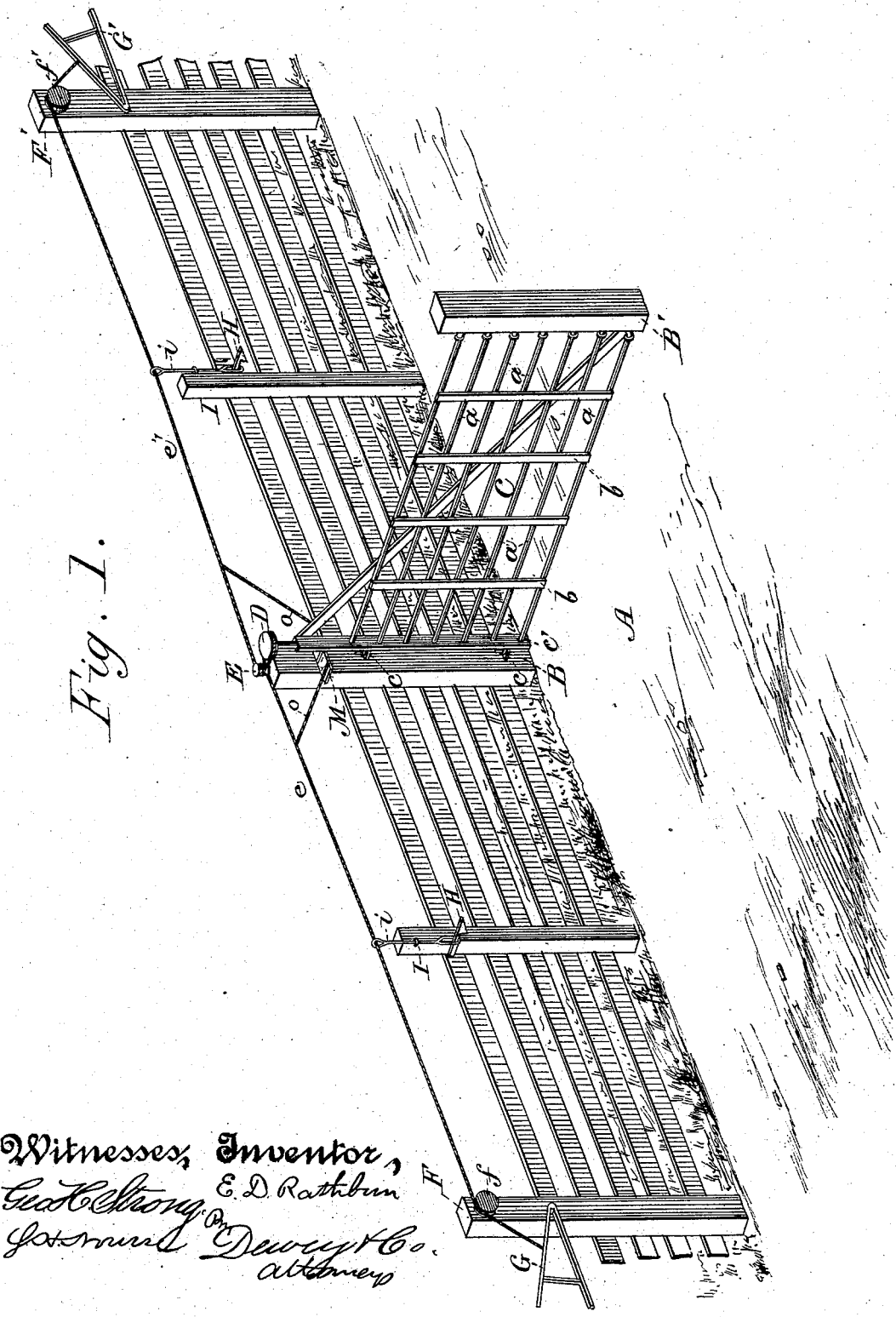

UNITED STATES PATENT OFFICE.

EDWIN DAVIS RATHBUN, OF WILLIAMS, CALIFORNIA.

GATE.

SPECIFICATION forming part of Letters Patent No. 295,674, dated March 25, 1884.

Application filed June 12, 1883. (No model.)

*To all whom it may concern:*

Be it known that I, EDWIN D. RATHBUN, of Williams, county of Colusa, and State of California, have invented an Improvement in Gates; and I hereby declare the following to be a full, clear, and exact description thereof.

My invention relates to that class of gates which are opened and closed by the operation of levers on the side of the roadway; and it consists in the novel construction and arrangement of the devices for operating the gate and the latch, and in a peculiar guard to prevent the gate from being opened except by the proper means, all of which I shall hereinafter explain.

The object of my invention is to provide a gate which can be readily opened and closed without descending from a vehicle or from a horse, and which will remain open or closed when desired.

Referring to the accompanying drawings, Figure 1, Sheet 1, is a perspective view of my device. Fig. 2, Sheet 2, is an enlarged view of a portion of my gate, showing the blocks $k$ and spring-catches $m$. Fig. 3 is a view of a portion thereof, showing plate M and pins $n$.

A is the roadway, upon opposite sides of which are the gate-posts B B'. C is the gate, hung by hinges $c$ to the post B. This gate is made of gas-pipe $a$, with elbow-couplings, and is braced by cross-bars $b$, of iron or steel. This makes a light and strong gate. The post $c'$ of the gate-frame is also a metal bar. The hinges $c$ consist merely of hooks in the gate-post and eyes in the frame-post, whereby a loose hinge is formed for the purpose of allowing the other side of the gate to be raised sufficiently to clear itself from the peculiar catch hereinafter described.

Upon the top of the frame-post $c'$ is a large pulley, D, and upon the top of the gate-post B is a double pulley, E. A rope, $e$, is secured to the face of pulley D at the point farthest from the gate-post B. It thence passes around about a quarter of the circumference of said pulley, and around one of the faces of the double pulley E, and thence to a post, F, on the side of the road, over a pulley, $f$, on said post, and down to a pivoted lever, G. A rope, $e'$, which is a continuation of rope $e$, passes around the other side of said pulley, around the other face of pulley E, and off to a post, F', over a pulley, $f'$, thereon, and down to a pivoted lever, G'. Upon approaching the gate the operator forces down one of the levers G G'. This pulls on the rope, turns pulley D, and swings the gate open. The ropes are so arranged that the gate shall open away from the operator. After he has passed through, he depresses the other lever and closes the gate.

In order to hold the gate open, there are gravitating latches H pivoted to posts I. Upon the front edge of the gate are projecting pins or plates $h$. The upper plate engages with the latches H and holds the gate. A wire or cord, $i$, is connected with these latches and with the ropes $e$ $e'$ above. This cord or wire is of such a length that the latches are allowed barely to engage with the gate-pins. When the lever is depressed, in order to close the gate, the taking up of the slight slack in the rope is sufficient to raise the latch out of engagement with the pins and free the gate.

Upon the gate-post B' are secured blocks $k$, upon which the spring-catches $m$ are secured. These catches consist of a single strip of spring metal, having its ends bent back and extending upwardly and converging, forming inclined planes. These ends do not meet, thus leaving a space between. As the gate swings shut, its pins or plates $h$ press over the inclined ends of the catches, which spring up behind them as soon as they are freed. The gate can go no farther, because the other end of the catch opposes its pin, and it is thus confined. In this manner the gate is made to close at once and not oscillate or go past the catch.

It is obvious that with such a catch it is necessary, in order to release the gate, to lift its pins out of the catches. This is the object of the loose hinges $c$, as they permit this movement. It is accomplished by the strain on the opening-ropes $e$ $e'$, passing from the pulley D on the frame-post around the pulley E on the gate-post. The pulley D, in addition to being turned, is drawn toward pulley E, and thus the other edge of the gate is raised sufficiently to cause its pins to clear the catches.

In order to prevent cattle from opening the gate by raising it free of its catches, I have the guard-plate M. This lies between the frame-post $c'$ and the gate-post B, upon pins $n$ in said gate-post. Its width is about that of the space between said posts, so that when lying flat upon its supporting-pins it will bind between the posts and prevent the gate from being tilted. Its edges near its ends are connected by cords $o$ with ropes $e\ e'$. These cords are of a length just sufficient to allow the guard-plate to lie down flat when the ropes $e\ e'$ are somewhat slack. When this slack is taken up by the operation of the levers G G′, the guard is tilted upward away from the gate toward an edge position, which allows the gate to be tilted. The guard-plate is long enough and is free to slide on its pins when the ropes $e\ e'$ are drawn.

Having thus described my invention, what I claim as new, and desire to secure by Letters Patent, is—

1. The swinging gate C, having pins or plates $h$ in its edge, and the means for swinging it, consisting of the pulleys D E, ropes $e\ e'$, and levers G G′, in combination with the gravitating latches H H on posts I, engaging with projecting pin $h$, the wires or cords $i\ i$, connecting said latches with ropes $e\ e'$, and the catches $m\ m$, secured to post B′, and constructed as shown, substantially as and for the purpose herein specified.

2. The gate-post B, the swinging gate C, loosely hinged thereto, and having pins or plates $h$ in its edge, the catches $m$, with which said pins engage, consisting of spring-strips having their ends bent back and inclined upwardly, and the means for raising said pins out of the catches and swinging the gate, consisting of the pulleys D E, the ropes $e\ e'$, and levers G G′, all arranged substantially as herein described.

3. The gate-post B, the gate C, having frame-post $c'$, loosely hung by hinges $c$ to the gate-post, and having pins $h$, the catches $m$, with which they engage, and the means for operating the gate, consisting of the pulleys D E, ropes $e\ e'$, and levers G G′, in combination with the means for preventing the gate from being released, except by said levers G G′, consisting of the guard-plate M, supported on pins $n$ between the gate-post and frame-post, and connected with ropes $e\ e'$ by cords $o$, substantially as herein described.

In witness whereof I have hereunto set my hand.

EDWIN DAVIS RATHBUN.

Witnesses:
JOHN H. LIENING,
LOGAN KILGORE.